United States Patent [19]

Matsuura

[11] Patent Number: 4,673,046
[45] Date of Patent: Jun. 16, 1987

[54] CONTROL SYSTEM FOR COMBINED WEIGHING APPARATUS

[75] Inventor: Yoshikazu Matsuura, Tokyo, Japan

[73] Assignee: Teraoka Seiko Company Limited, Tokyo, Japan

[21] Appl. No.: 862,197

[22] Filed: May 9, 1986

Related U.S. Application Data

[63] Continuation of Ser. No. 625,618, Jun. 28, 1984, abandoned.

[30] Foreign Application Priority Data

Jun. 30, 1983 [JP] Japan ................................. 58-118724
Jun. 30, 1983 [JP] Japan ................................. 58-118728

[51] Int. Cl.$^4$ ...................... G01G 19/00; G01G 19/22
[52] U.S. Cl. .......................................... 177/1; 177/25; 177/70
[58] Field of Search .......... 177/1, 25, 50, 70, DIG. 12

[56] References Cited

U.S. PATENT DOCUMENTS 4,511,010 4/1985 Sashiki et al. ...................... 177/25
4,533,006 8/1985 Minamida et al. .................... 177/25

Primary Examiner—Harold Broome
Assistant Examiner—Patrick W. Foster
Attorney, Agent, or Firm—Watson, Cole, Grindle and Watson

[57] ABSTRACT

This invention relates to an improvement of a control system for a combined weighing apparatus which in more detail includes a plurality of measuring hoppers supplied with products to be measured from transfer means for measuring weights of the products to select a weight equal to or near to a set weight from any combinations of the measured weights, and more particularly to an improvement of a condition-setting system and a measuring hopper combination-selecting system capable of remarkably facilitating setting of data of set weight, transfer conditons and the like by means of the condition-setting system when products to be measured are changed and capable of shortening the time for selecting a combination of measured values so as to enable the combination operation to speed up.

9 Claims, 7 Drawing Figures

FIG. 4

```
                                    ╱16
┌─────────────────────────────────┐
│         ITEM  CODE              │
├─────────────────────────────────┤
│            ITEM                 │
├─────────────────────────────────┤
│         SET  WEIGHT             │
├─────────────────────────────────┤
│        SET  TOLERANCE           │
├─────────────────────────────────┤
│       SET  ISSUE  NUMBER        │
├─────────────────────────────────┤
│         UNIT  WEIGHT            │
├─────────────────────────────────┤
│          UNIT  PRICE            │
├─────────────────────────────────┤
│      AUTOMATIC NET WEIGHT       │
├─────────────────────────────────┤
│    DISTRIBUTION FEEDER          │
│    NUMBER OF VIBRATION          │
├─────────────────────────────────┤
│    DISTRIBUTION FEEDER          │
│    AMPLITUDE                    │
├─────────────────────────────────┤
│    SUPPLY FEEDER                │
│    NUMBER OF VIBRATION          │
├─────────────────────────────────┤
│    SUPPLY  FEEDER               │
│    AMPLITUDE                    │
├─────────────────────────────────┤
│    SUPPLY  FEEDER               │
│    TRANSFER TIME                │
├─────────────────────────────────┤
│                                 │
├─────────────────────────────────┤
│         ITEM  CODE              │
├─────────────────────────────────┤
│            ITEM                 │
└─────────────────────────────────┘
```

FIG. 5

```
                            ╱17
┌──────────────────────────┐
│          ITEM            │
├──────────────────────────┤
│     TOTAL SET WEIGHT     │
├──────────────────────────┤
│    TOTAL ACTUAL WEIGHT   │
├──────────────────────────┤
│    TOTAL ACTUAL ERROR    │
├──────────────────────────┤
│    TOTAL ISSUE NUMBER    │
├──────────────────────────┤
│     TOTAL SET MONEY      │
├──────────────────────────┤
│    TOTAL ACTUAL MONEY    │
├──────────────────────────┤
│      TOTAL NUMBER        │
├──────────────────────────┤
│          ITEM            │
└──────────────────────────┘
```

CONTROL SYSTEM FOR COMBINED WEIGHING APPARATUS

This application is a continuation of application Ser. No. 625,618, filed June 28, 1984, now abandoned.

BACKGROUND OF THE INVENTION

1. Field of the Invention

This invention relates to an improvement in a control system for a combined weighing apparatus which includes a plurality of measuring hoppers supplied with products to be measured from transfer means for measuring weights of the products to select a weight equal to or near to a set weight from any combinations of the measured weights, and more particularly, to an improvement in a condition-setting system and a measuring hopper combination-selecting system.

2. Description of the Prior Art

In prior art combined weighing apparatuses, every time the kind of product to be measured changes, the set weight, a deviation value, an item is input into a system by the operation of keys, and transfer conditions (transfer time, transfer power and the like) to hoppers are newly set and adjusted. In changing products to be measured, therefore, the operation efficiency cannot be expected to be improved due to the these troublesome input operations and adjustment operations.

In prior art measuring hopper combination-selecting systems, moreover, after weights of products supplied into a plurality of measuring hoppers have been individually measured, the measured values are suitably combined to calculate all the combination weights, from which a weight nearest to a set weight is selected.

In combined weighing apparatuses, the higher the number of measuring hoppers, the higher is the measuring accuracy. If the measuring hoppers are many, however, the number of combinations is greatly increased. For example, the relation between the numbers of measuring hoppers and combinations are as follows.

8 measuring hoppers . . . 255 combinations
10 measuring hoppers . . . 1,023 combinations
16 measuring hoppers . . . 65,535 combinations In the prior art combination arithmetic methods, if the measuring hoppers to be combined are more than 10, it takes a considerably long time to combine the measuring hoppers, lowering its operation efficiency.

Furthermore, even if a combined weight nearest to a set weight is found in a first part of the combination arithmetic operation, the combined weight is selected after the remaining combination arithmetic operation has been effected, so that precious time is uselessly lost.

Moreover, even if the combination weight nearest the set weight is selected, its accuracy is not necessarily high. For example, when the products in respective measuring hoppers are considerably unbalanced, even the combined weight nearest to the set weight is often remarkably different from the set weight.

SUMMARY OF THE INVENTION

This invention is intended to eliminate the disadvantages of the prior art. It is an object of the invention to provide a combined weighing apparatus which is superior in ease of operation and has a condition-setting system capable of very easily setting data such as set weight, transfer conditions, and the like when products to be measured are changed, by previously presetting data such as set weights, transfer conditions, and the like for every product to be measured.

It is another object of the invention to provide a combined weighing apparatus suitable for high speed operation by shortening the time required to select combinations of measured values so as to improve the speed of combination operation.

The condition-setting system according to the invention comprises a central processor unit for controlling the transfer means and the measuring hoppers and setting code numbers of the kinds of products to be measured, a preset memory connected to the central processor unit for memorizing condition data such as set weights and transfer conditions corresponding to each code number so as to cause the preset memory to output relevant data by inputting a code number into the central processor unit.

According to the condition-setting system, every time when products to be measured are changed, it is not necessary to set the set weight and transfer conditions and all that is required is to designate the products to be measured, thereby simplifying its operation.

Furthermore, the measuring hopper combination-selecting system according to the invention comprises steps of successively calculating combined weights from measured values by the measuring hoppers according to a previously set combination order, successively judging whether the combined weights are within a tolerance of the set weight, and completing an arithmetic operation for the combination when a combined weight within the tolerance is selected.

The combination-selecting system according to the invention eliminates the superfluous time in the combination arithmetic operation so as to do its operation with very high efficiency to achieve high speed operation. Moreover, combined weight is selected within a set weight without fail, so that the accuracy in combination is determined by setting a tolerance and therefore any accuracy in combination can be conveniently set at will.

The invention will be more fully understood by referring to the following detailed explanation and taken in connection with the appended drawings.

BRIEF DESCRIPTION OF THE DRAWINGS

FIG. 4 illustrates an arrangement of a preset memory used in the invention;

FIG. 5 illustrates an arrangement of a sum-up data memory used in the invention;

DESCRIPTION OF THE PREFERRED EMBODIMENTS

Figure 1:
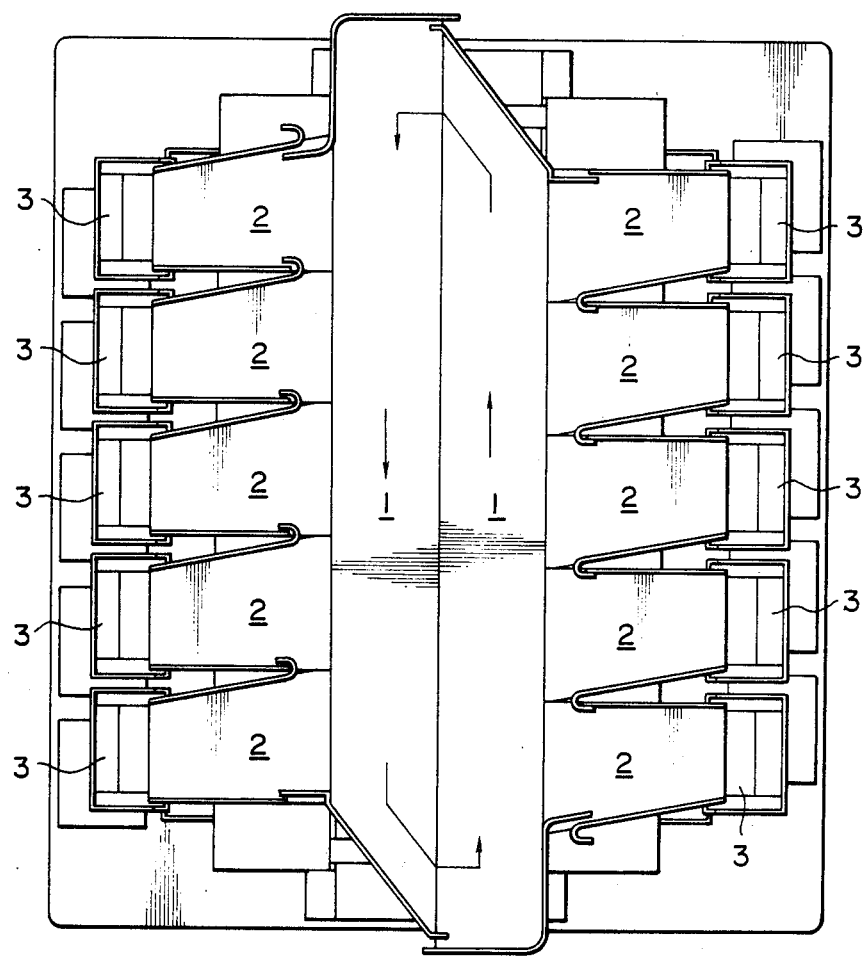
FIG. 1 is a plan view schematically illustrating a combined weighing apparatus according to the invention.
Figure 2:
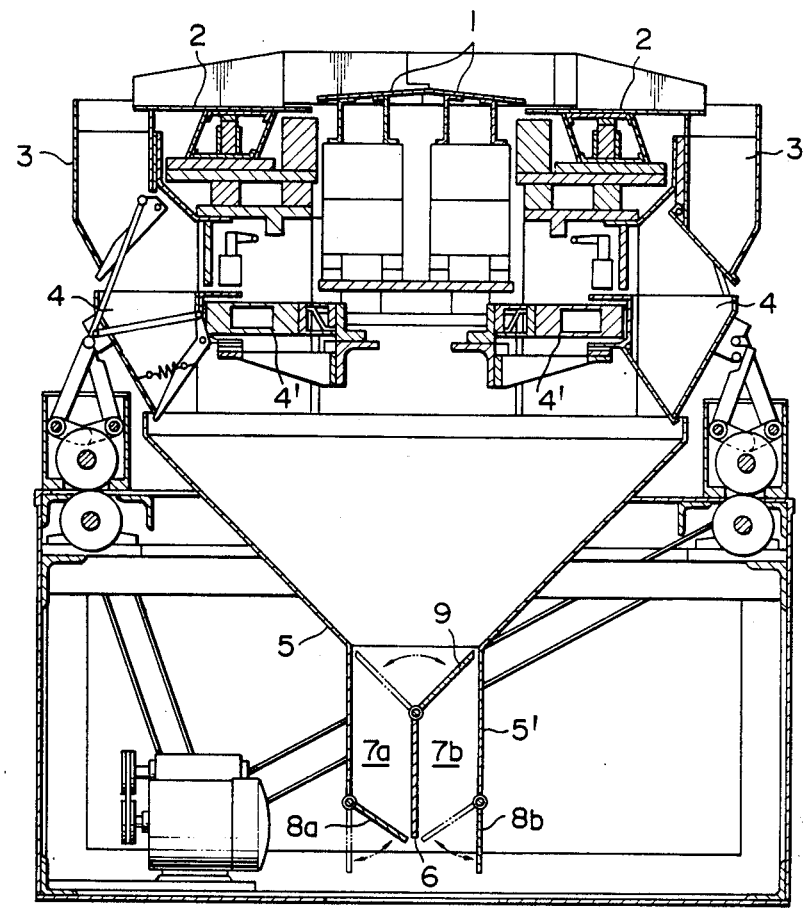
FIG. 2 is a longitudinally sectional front elevation of the apparatus shown in FIG. 1.

Referring to FIGS. 1 and 2 illustrating a combined weighing apparatus according to the invention, the apparatus comprises substantially elongated rectangular distribution plates 1 for distributing products to be measured while they are transferred in directions as shown by arrows in FIG. 1, supply troughs 2 arranged side by side at intervals about the distribution plates 1 to form transferring means, pool hoppers 3 located under exhaust ends of the supply troughs 2, and measuring hoppers 4 having weighing portions 4' arranged directly below the pool hoppers 3. In this embodiment, there are provided ten supply troughs, pool hoppers and measuring hoppers, respectively.

The supply troughs 2 transfer the products to be measured from the distribution plates 1 into the pool hoppers 3 when the pool hoppers are empty. The pool hoppers 3 temporarily store the products and transfer them into the measuring hoppers 4 below when the hoppers are empty.

The measuring hoppers 4 measure the products therein and some of the measuring hoppers selected in a predetermined manner exhaust the products therein into a collection hopper 5 arranged below the measuring hoppers 4.

The collection hopper 5 is in the form of an inverted cone which is provided at its lower end with a collection tube 5' for collecting the products to be measured, which is divided by a partition 6 into a first storing chamber 7a and a second storing chamber 7b adjacent each other.

The first and second storing chambers 7a and 7b are provided at their lower ends with outlet valves 8a and 8b adapted to be freely closed and opened, while the partition 6 is provided at its upper end with an inlet valve 9 adapted to be closed and opened, so that one of the storing chambers is opened and simultaneously the other is closed.

Predetermined amounts of the products exhausted in the above collection hopper 5 are in succession alternately fed into the first and second storing chambers 7a and 7b by the operation of the inlet valve 9 and temporarily stored in the first and second chambers. When the outlet valves 8a and 8b are alternately opened, the products are exhausted from the respective storing chambers 8a and 8b so as to be fed into a transferring apparatus such as a packaging machine.

Figure 3:
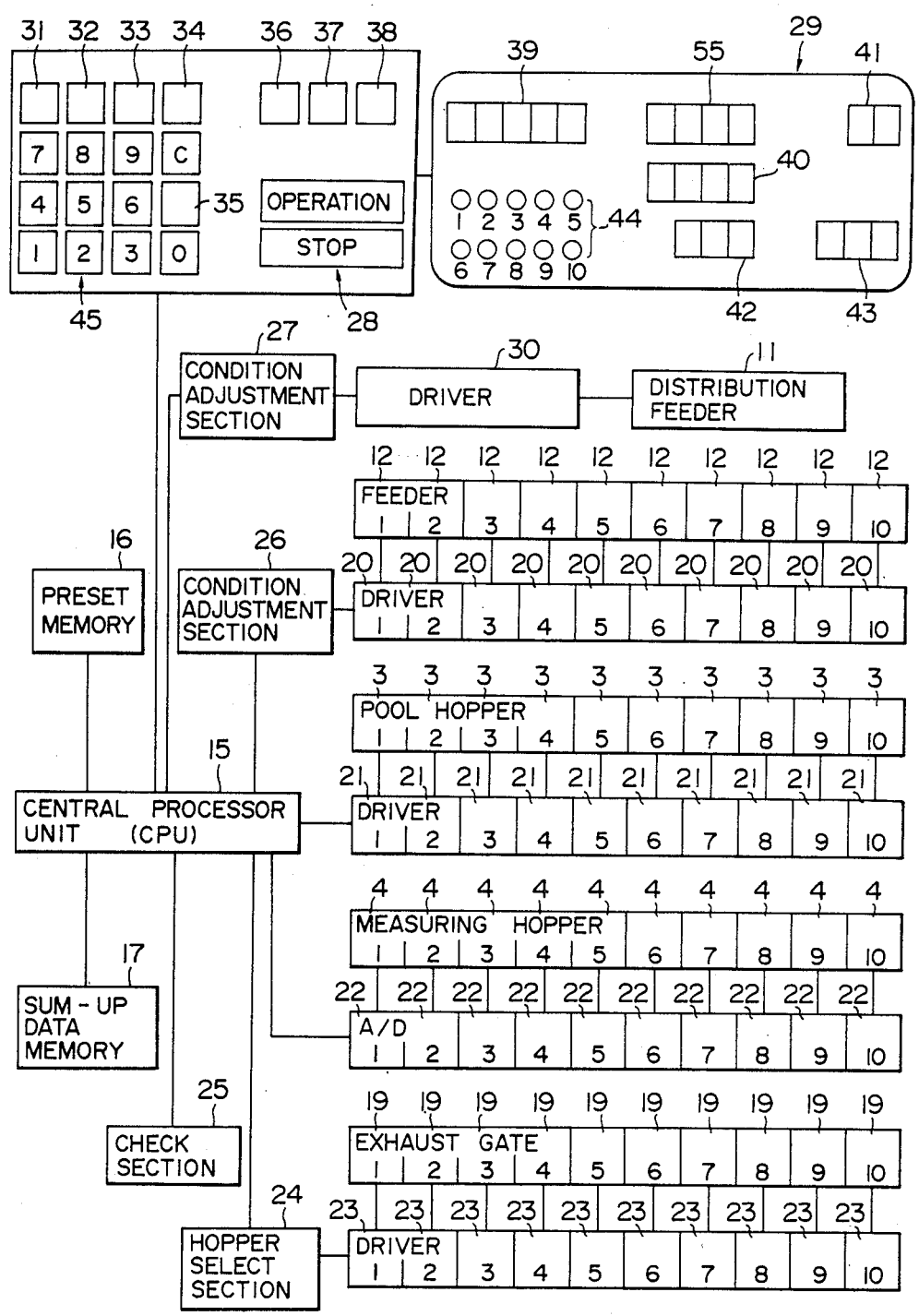
FIG. 3 is a block diagram of the combined weighing apparatus for explaining the condition-setting system according to the invention.

FIGS. 3-5 are intended to explain the condition-setting system for the combined weighing apparatus. FIG. 3 illustrates a distribution feeder 11 for driving the above-mentioned distribution plates 1 and supply feeders 12 for driving the supply troughs 2.

The distribution feeder 11 is connected to a central processor unit (CPU) 15 through a driver 30 for driving the distribution feeder 11 and a condition adjustment section 27 for adjusting transfer conditions in accordance with set transfer conditions.

The supply feeders 12 are connected to the central processor unit (CPU) 15 through respective drivers 20 for driving the supply feeders 12 and a condition adjustment section 26 for adjusting transfer conditions in accordance with set transfer conditions.

To the central processor unit (CPU) 15 are connected drivers 21 for closing and opening their bottom plates of the above-mentioned pool hoppers 3. The measuring hoppers 4 are connected to the central processor unit (CPU) 15 through respective analog-to-digital conversions 22. Exhaust gates 19 of the respective measuring hoppers 4 are connected to the central processor unit 15 through drivers 23 for the gates 15 and a hopper selection 24.

The hopper selection 24 determines the selected combined hoppers to energize the drivers 23 associated with the selected hoppers.

Moreover, to the central processor unit 15 are connected a preset memory 16, a sum-up data memory 17, an operation section 28 and a display unit 29.

As shown in FIG. 4, the preset memory 16 sets items of every product to be measured and memorizes item code numbers, items, set weights, set tolerances, transfer conditions such as numbers and amplitudes of vibrations of the distribution feeders and the supply feeders and further set issue numbers, unit weights and unit prices to be inputted together. In case of rice rackers, for example, the following values are set, the set weight of 100 g/per bag, the set tolerance of $-2\%$ to $+6\%$ or $-2$ g to $+6$ g, and transfer conditions as vibration number of 60 Hz, amplitude of 1 mm and transfer time of 2 seconds.

Furthermore, automatic net weight is memorized in order to obtain net weight by subtracting dregs attached to the inside of the measuring hopper after a constant time and a constant number of measuring.

The operation section 28 inputs set values into the preset memory 16. The display unit 29 displays set values to be inputted into the preset memory 16, actual values of combined products to be measured or the like.

The operation section 28 comprises an issue-setting key 31, a weight-setting key 32, a tolerance-setting key 33, a code-setting key 34, a transfer time-setting key 35, a finish key 36, an exhaust key 37, a test key 38 and ten keys 45, thereby affecting preset operation. The preset operation is effected by the steps of pressing the issue-setting key 31 and then any one of the above keys 32, 33 and 35 associated with the item to be preset, and thereafter inputting required numerals by pushing the ten keys 45 and then pushing the finish key 36 to complete the preset operation. At the commencement or termination of the preset operation, the code-setting key 34 is pressed and the item code number is inputted by the ten keys 45, thereby making the content to be preset correspond to the item code number.

Moreover, the exhaust ket 37 is pressed to exhaust all the products to be measured after the operation has been completed. The test key 38 serves to check whether the operation is effected in the same manner as the preset memory.

The sum-up data memory 17 memorizes actual values of every product to be measured, for example, total actual weight, total actual error, total issue number, total actual memory, and total number and further total set weight, total set memory and the like as shown in FIG. 5.

A check section 25 checks or inspects the measured values of the products in the respective measuring hoppers to determine whether it is required to finely adjust the set transfer conditions and, if required, adjusts the condition adjustment sections 26 and 27.

The display unit 29 includes respective display portions 39 for times of measuring, 40 for set weight, 41 for tolerance, 42 for error and 43 for codes and a group of lamps 44 for indicating the measuring hoppers 4 taking part in the combination for the measurement.

Furthermore, the central processor unit 15 selects the measuring hoppers 4 to be combined on the basis of the set weight and selects the transfer conditions memorized in the preset memory 16 with the aid of the designated item code number to inform the selected transfer conditions to the condition adjustment sections 26 and 27.

In order to set the conditions for the combined weighing apparatus, an item code number indicating the kind of product to be measured is input into the operation section 28 by pushing the ten keys 45. As the a result, the data of the relevant code number is outputted from the preset memory 16 into the condition-adjustment sections 26 and 27, so that the transfer conditions for the feeders 11 and 12 for driving the distribution plates 1 and supply troughs 2, the set weight and the like are automatically set into predetermined values.

A combination selecting system for selecting the combination of the measuring hoppers 4 of the combined weighing apparatus will be explained later. In the event that the ten measuring hoppers are used as in this embodiment, the maximum combination number (which means the highest combination accuracy) is five (5) of the selected measuring hoppers, which is indicated as $_{10}C_5$.

It is assumed that one fifth of the set weight of the products is supplied as a target weight to each the measuring hopper 4. A preferred order of combinations of the measuring hoppers is as follows.

$$_{10}C_5 \rightarrow \begin{matrix} _{10}C_4 \\ _{10}C_6 \end{matrix} \rightarrow \begin{matrix} _{10}C_3 \\ _{10}C_7 \end{matrix} \rightarrow \begin{matrix} _{10}C_2 \\ _{10}C_8 \end{matrix} \rightarrow \begin{matrix} _{10}C_1 \\ _{10}C_9 \end{matrix} \rightarrow {_{10}C_{10}}$$

In other words, as the combinations on the left side are preferable, any one of the combinations on the left side should be preferentially selected.

In the above preferred order of the combinations, $_{10}C_4$ and $_{10}C_6$ are in the same grade or ranking, because they are complement distribution combinations. In other words, if the measured values of the respective measuring hoppers are $X_1, X_2, X_3 \ldots X_{10}$, the same numbers of the complement distribution combinations are obtained as follows.

| $_{10}C_4$ | $_{10}C_6$ |
|---|---|
| $X_1, X_2, X_3, X_4,$ | $X_5, X_6, X_7, X_8, X_9, X_{10},$ |
| $X_1, X_2, X_3, X_5,$ | $X_4, X_6, X_7, X_8, X_9, X_{10},$ |
| . | . |
| . | . |
| . | . |

In consideration of equalization of used frequencies of the respective measuring hoppers, $_{10}C_4$ and $_{10}C_6$ may be alternately arranged in combination grade. The same holds true in $_{10}C_3$ and $_{10}C_7$, $_{10}C_2$ and $_{10}C_8$, and $_{10}C_1$ and $_{10}C_9$.

The combinations used in actual cases are $_{10}C_5$, $_{10}C_4$ and $_{10}C_6$. The following combination list is previously prepared and according to its order the calculation for the combination is carried out. In the list, numeral 1 means "taking part in combination" and 0 means "not taking part in combination".

|  | $X_1$ | $X_2$ | $X_3$ | $X_4$ | $X_5$ | $X_6$ | $X_7$ | $X_8$ | $X_9$ | $X_{10}$ |
|---|---|---|---|---|---|---|---|---|---|---|
| CB 0 | 1 | 1 | 0 | 0 | 1 | 0 | 1 | 0 | 1 | 0 |
| CB 1 | 0 | 0 | 1 | 1 | 0 | 1 | 0 | 1 | 0 | 1 |
| . |
| CB n | 1 | 0 | 1 | 1 | 0 | 0 | 1 | 0 | 1 | 0 |
| CB n+1 | 0 | 1 | 0 | 0 | 1 | 1 | 0 | 1 | 0 | 1 |
| CB n+2 | 1 | 0 | 1 | 0 | 1 | 0 | 1 | 0 | 1 | 0 |
| CB END | 0 | 0 | 1 | 0 | 1 | 1 | 0 | 1 | 0 | 0 |

It is assumed that the combination number is CBn, its combined weight is Fn, the set weight is 100 g and its tolerance is 0 to +2 g. If the weights of $X_1$ and $X_{10}$ are following, then Fn, $F_{n+1}$ and $F_{n+2}$ are determined.

| $X_1 =$ | 20.5 (g) | $X_6 =$ | 31.2 (g) |
|---|---|---|---|
| $X_2 =$ | 35.6 | $X_7 =$ | 22.4 |
| $X_3 =$ | 15.6 | $X_8 =$ | 28.7 |
| $X_4 =$ | 17.1 | $X_9 =$ | 23.8 |
| $X_5 =$ | 17.9 | $X_{10} =$ | 19.5 |
| $F_n =$ | $X_1 + X_3 + X_4 + X_7 + X_9$ | | |
| $=$ | 20.5 + 15.6 + 17.1 + 22.4 + 23.8 | | |
| $=$ | 99.4 (g) shortage, | | |
| $F_{n+1} =$ | $X_2 + X_5 + X_6 + X_8 + X_{10}$ | | |
| $=$ | 35.6 + 17.9 + 31.2 + 28.7 + 19.5 | | |
| $=$ | 132.9 (g) excess, and | | |
| $F_{n+2} =$ | $X_1 + X_3 + X_5 + X_7 + X_9$ | | |
| $=$ | 20.5 + 15.8 + 17.9 + 22.4 + 23.8 | | |
| $=$ | 100.2 (g) within the tolerance | | |

Accordingly, the combined weight of $F_{n+2}$ is selected. The combination number need not be changed to $CB_{n+3}$.

The arithmetic method of combined weight according to the invention as above described is not essentially changed, even if the number of combination is changed. For example, if it is required to obtain the set weight of 100 g by the combination of three hoppers, the products of 33.3 g may be supplied as a target weight to the respective measuring hoppers. In this case, the preferred order of combination is $_{10}C_3 \rightarrow {_{10}C_4} \rightarrow {_{10}C_2}$. In consideration of the used frequencies of the measuring hoppers in the combination of $_{10}C_3$, the measuring hoppers not taking part in the combination are preferentially used. For example, it is preferable that $X_1X_2X_4 \rightarrow X_3X_5X_6 \rightarrow X_7X_8X_9 \rightarrow X_{10}X_1X_2 \rightarrow \ldots$ The processes thereafter are the same as in the above selection of combination, so that more detailed explanation will not be provided.

Figure 6:
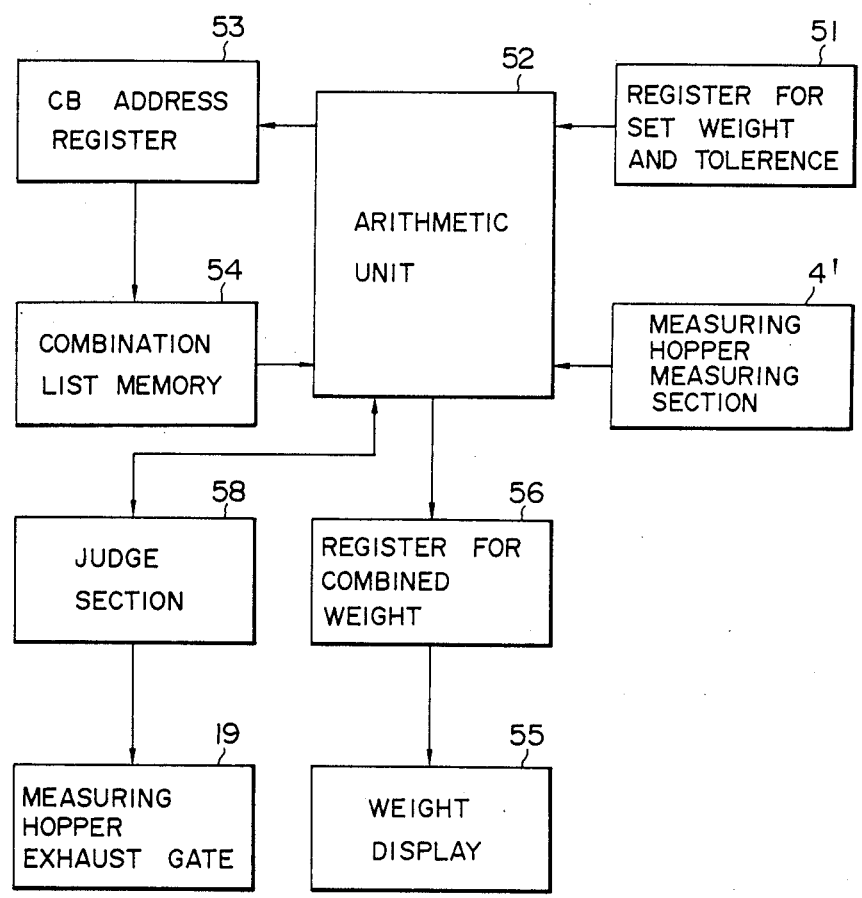
FIG. 6 is a block diagram of the combined weighing apparatus for explaining a combination selecting system used in the invention.

The above selection of combination will be explained in detail by referring to FIG. 6 which is a block diagram of those associated with the selection of combination in the combined weighing apparatus.

In the drawing, a register 51 for memorizing the set weight and tolerance is connected to an arithmetic unit 52 and inputs the set weight and its tolerance into the arithmetic unit 52.

The arithmetic unit 52 successively calculates combined weights on the basis of the combination list determined in the preferred order and is connected to a combination address register 53 (referred to as "CB address register" hereinafter) and a combination list memory 54.

The CB address register 53 is a register for designating address in the combination list memory 54. The combination list memory 54 memorizes the above mentioned combination lists and selects the combination designated in the CB address register 53 from the combination list memory 54 to input the selected combination into the arithmetic unit 52.

The weighing portions 4' of the measuring hoppers 4 are connected to the arithmetic unit 52 and measure the products in the measuring hoppers to input the measured values into the arithmetic unit 52.

Outputs of the arithmetic unit 52 are inputted into a register 56 and a judge section 58. The register 56 temporarily memorizes the combined weight and outputs ultimately selected combined weight into the display unit 29 so as to display it on the weight display section 55 (FIG. 3) of the unit 29.

The judge section 58 judges whether the combined weight, is within the tolerance or allowable range, and after determination of the combined weight the judge section 58 actuates the exhaust gates 19 (FIG. 3) of the measuring hoppers 4 to open them. If the combined weight is not determined, then the content of the CB address register 53 is renewed through the arithmetic unit 52.

Figure 7:
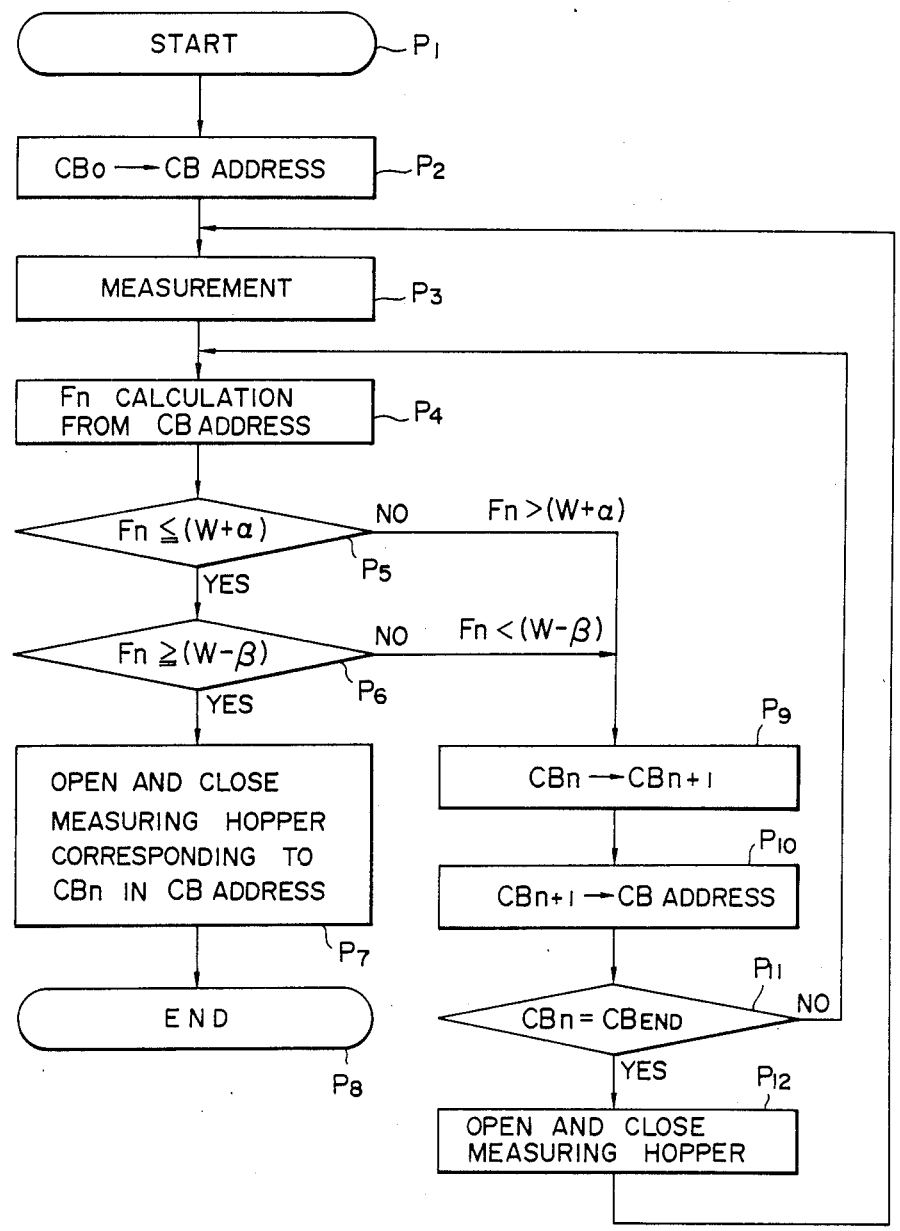
FIG. 7 is a flow chart of the control system according to the invention.

The processes of the above selection of the combination will be explained by referring to FIG. 7 which includes an arithmetic value Fn of the combination, a set weight W, an upper tolerance $\alpha$ and a lower tolerance $\beta$. ($P_1$) When the arithmetic operation of combination is started, ($P_2$) the first combination number $CB_o$ is set in the CB address, and then ($P_3$) the products in the respective measuring hoppers are measured.

($P_4$) The arithmetic operation of combination designated in the CB address is effected so as to ($P_5$) judge whether the arithmetic value $F_n$ of the combination is beyond the upper tolerance value ($W+\alpha$) if it is within the tolerance, to indicate (Yes), and ($P_6$) judge whether the value $F_n$ is within the lower tolerance value ($W-\beta$), if it is within the tolerance, to indicate (Yes). ($P_7$) The measuring hoppers corresponding to the combination are opened or closed ($P_8$) to obtain the combination.

If the arithmetic value $F_n$ is beyond the upper tolerance value ($W+\alpha$) to indicate ($P_5$, No) or less than the lower tolerance value ($W-\beta$) to indicate ($P_5$, No), then ($P_9$) the CB address register 53 is renewed or to count the combination number $CB_n$ once to ($P_{10}$) set it in the CB address.

Then ($P_{11}$) whether all the combinations ($CB_o$-$CB_{end}$) are finished is checked, if there are remaining combinations, to indicate (No). Thereafter, the steps after ($P_4$) are repeated.

When all the combinations ($CB_o$-$CB_{end}$) are finished ($P_{11}$, Yes) and there is no combination, ($P_{12}$) the contents in part or all of the measuring hoppers are exhausted to ($P_3$) effect the measurement again.

While the invention has been particularly shown and described with reference to preferred embodiments thereof, it will be understood by those skilled in the art, that the foregoing and other changes in form and details can be made therein without departing from the spirit and scope of the invention.

I claim:

1. A process for controlling a weighing apparatus having a plurality of measuring hoppers to select a combination of measuring hoppers having measured products with a total weight substantially equal to a set weight, comprising:
    inputting data of said set weight and an allowable tolerance thereof to said weighing apparatus;
    controlling the transfer of a predetermined weight of the product to each of said plurality of measuring hoppers;
    sequentially calculating the total weight of preselected combinations of the weights of products in said plurality of measuring hoppers;
    after calculation of each of said preselected combinations of the total weight, determining whether said total weight falls within said set weight and tolerance therefor;
    continuing said sequential calculation and determination of the combined weight until a determination is made that a total weight is within said set weight and tolerance; and
    collecting the product contained in each of said measuring hoppers comprising said combination having a total weight substantially equal to said set weight.

2. The process as claimed in claim 1, wherein said predetermined weight is equivalent to total set weight divided by the number of said plurality of measuring hoppers participating in the preselected combination.

3. The process as claimed in claim 1, wherein the preselected combination is determined to essentially equalize the frequency of use of said measuring hoppers.

4. The process as claimed in claim 1, wherein the number of measuring hoppers participating in each of said preselected combinations is equal to one half the total number of measuring hoppers.

5. The process as claimed in claim 1, wherein at least some of the measuring hoppers are emptied and refilled when it is determined that there is no combination of measuring hoppers having a total weight substantially equal to said set weight after calculation of all of the preselected combinations, again controlling the transfer of a predetermined weight of the product to each of the emptied measuring hoppers, and repeating the steps of sequentially calculating and determination until a determination is made that a total weight is within said set weight and tolerance.

6. A weighing apparatus having a plurality of measuring hoppers for weighing a specified product to obtain a set total weight of product from a variable preselected number of the plurality of measuring hoppers and a control system for the weighing apparatus, comprising:
    means for transferring a designated amount of said product to each of said measuring hoppers;
    means for storing set weights, associated tolerances and preselected combinations of said measuring hoppers to participate in providing said set total weight in accordance with different numbers of participating measuring hoppers;
    central processing means for calculating the total weight of the preselected combinations stored in said means for storing and including means for determining whether the total weight of each calculation is within said set total weight and tolerance therefor; and
    means for exhausting the contents of each of said measuring hoppers participating in a preselected combination determined to contain said set total weight.

7. A weighing apparatus as claimed in claim 6, wherein said designated amount of product is equivalent to total set weight divided by the number of said plurality of measuring hoppers participating in the preselected combination.

8. Weighing apparatus as claimed in claim 6, further comprising means for displaying at least set weight, weight tolerance and measuring hoppers of a selected combination thereof producing said set total weight.

9. A weighing apparatus as claimed in claim 6, further comprising means for checking whether the measured value of each of said plurality of measuring hoppers is within a predetermined range.

* * * * *